(12) United States Patent
Kono et al.

(10) Patent No.: US 6,647,459 B1
(45) Date of Patent: Nov. 11, 2003

(54) REPRODUCING APPARATUS FOR RECORD DISC

(75) Inventors: Mutsumi Kono, Tokorozawa (JP); Takashi Morimae, Tokorozawa (JP)

(73) Assignee: Pioneer Corporation, Tokyo-To (JP)

(*) Notice: Subject to any disclaimer, the term of this patent is extended or adjusted under 35 U.S.C. 154(b) by 378 days.

(21) Appl. No.: 09/583,875

(22) Filed: May 31, 2000

(30) Foreign Application Priority Data

May 31, 1999 (JP) .......................................... 11-151352

(51) Int. Cl.⁷ .............................................. G06F 12/00
(52) U.S. Cl. .................... 711/112; 711/113; 711/133; 369/30.03; 369/30.04; 369/30.06; 369/30.28
(58) Field of Search ............................ 369/30.03–30.04, 369/30.28, 30.06; 711/113, 133, 112

(56) References Cited

U.S. PATENT DOCUMENTS

| | | | |
|---|---|---|---|
| 5,001,688 A | * 3/1991 | Louvenberg et al. | 369/30.28 |
| 5,063,547 A | * 11/1991 | Custers et al. | 369/30.03 |
| 5,195,066 A | * 3/1993 | Amemiya et al. | 369/30.06 |

FOREIGN PATENT DOCUMENTS

| | | |
|---|---|---|
| EP | 0 383 529 A1 | 8/1990 |
| EP | 0 838 948 A1 | 4/1998 |
| EP | 0 910 082 A2 | 4/1999 |

* cited by examiner

Primary Examiner—Donald Sparks
Assistant Examiner—Mehdi Namazi
(74) Attorney, Agent, or Firm—Sughrue Mion, PLLC (57) ABSTRACT

A reproducing apparatus (100) is provided with a reading device (4) for reading reproduction data and reproduction control data to control a reproduction of the reproduction data from a record disc (1), on which the reproduction data and the reproduction control data are recorded, a record medium (7, 10) having a plurality of memory areas, a data managing device (9) for storing one reproduction control data read by the reading device into one of the memory areas, and a reproducing device (8) for reproducing the reproduction data in accordance with the reproduction control data stored in the memory areas. The data managing device (9) is provided with: a retention priority memory for storing retention priority data, which indicate a retention priority as for each reproduction control data respectively stored in the memory areas; a selecting device for selecting one of the memory areas, into which the one reproduction control data read by the reading device is to be stored, on the basis of the retention priority data stored in the retention priority memory, when the one reproduction control data is read by the reading device; and a storing device for storing the one reproduced control data read by the reading device into the memory area selected by the selecting device.

18 Claims, 8 Drawing Sheets

| USAGE ORDER | SECTOR NUMBER | THE NUMBER OF TIMES OF USAGE | GROUP | TYPE OF REPRODUCTION CONTROL DATA |
|---|---|---|---|---|
| 1 | 0x00030010 | 4 | N | |
| 2 | 0x00030100 | 10 | N | |
| 3 | 0x00030020 | 4 | N | |
| 4 | 0x00030120 | 104 | M | VMGI_AT |
| 5 | 0x000301A0 | 28 | M | VTSI_AT#1 |
| 6 | 0x00033750 | 1 | N | |
| 7 | 0x00034180 | 824 | M | VTSI_AT#2 |
| 8 | 0x031ED330 | 1 | N | |
| 9 | 0x01030000 | 48 | M | VTSI_AT#3 |
| 10 | 0x01112C20 | 162 | M | VTSI_AT#4 |
| 11 | 0x001E8DC0 | 1 | N | |
| 12 | 0x01035E80 | 1 | N | |
| 13 | 0x0105CF00 | 1 | N | |
| 14 | 0x01060900 | 1 | N | |
| 15 | 0x0003FC60 | 1 | N | |
| 16 | 0x000647A0 | 1 | N | |
| 17 | 0x000907F0 | 1 | N | |

REPRODUCING APPARATUS FOR RECORD DISC

BACKGROUND OF THE INVENTION

1. Field of the Invention

The present invention relates to a reproducing apparatus for reproducing data from a record disc, on which reproduction data, such as video image, audio sound, subtitle and the like, and reproduction control data to control the reproduction of the reproduction data are recorded, such as a DVD for example.

2. Description of the Related Art

On a DVD, there are recorded not only reproduction data, such as video image, audio sound, subtitle and the like, but also reproduction control data to control the reproduction of the reproduction data. When the DVD is reproduced, a reproducing apparatus reads the reproduction control data recorded on the DVD, and uses it to specify a record position on the DVD of the reproduction data and set a reproduction order of the reproduction data for example.

The reproducing apparatus usually has a work memory for transiently storing therein a part of the reproduction control data read out from the DVD. The reproduction control data can be quickly used if the reproduction control data frequently required during the reproducing operation is stored in this work memory, in advance of actually reproducing the reproduction data by using this reproduction control data. This is because a reading speed of reading the reproduction control data from the work memory (for example, 0.1 $\mu$sec) is extremely faster than a reading speed of reading the reproduction control data from the DVD (for example, 200 m sec).

By the way, a complex control is required to reproduce the DVD, in order to attain the reproduction of the video image and the audio sound rich in an interactive property. For this reason, the amount of the reproduction control data which is used for the operation for reproducing the reproduction data recorded on the DVD is very large, and is extremely large as compared with a capacity of the work memory (for example, about 1000 times). As a result, the reproduction control data, which is used after reading out from the work area during the reproducing operation, is only a part of the whole reproduction control data. Most of the reproduction control data is used after reading out from the DVD. In this way, in the reproduction of the DVD, there is a problem that the work memory cannot be effectively used. Also, this problem can be solved by increasing the capacity of the work memory. However, the increase of the capacity of the work memory brings about another problem of the increase of a cost of the reproducing apparatus. Thus, this is not desirable.

On the other hand, the usage efficiency of the work memory may be improved if the reproduction control data frequently used during the reproducing operation can be expected in advance. However, the kind or structure of the reproduction control data recorded on the DVD may be significantly changed in accordance with intention of an author or manufacturer of the DVD. Further, how to reproduce the reproduction data recorded on the DVD is variously changed depending upon the condition when a user operates the reproducing apparatus. Thus, it is difficult to expect in advance the reproduction control data frequently used during the reproducing operation.

The number of times of reading out the data from the DVD is increased if the work memory cannot be effectively used. The operation for reading out the data from the DVD involves a physical movement of an optical pickup and the like. Thus, the increase in the number of times of reading out the data from the DVD leads to the increase in a consumption power of the reproducing apparatus, and also results in a problem that a life of an optical pickup movement mechanism for moving the optical pickup is made shorter.

SUMMARY OF THE INVENTION

The present invention is proposed in view of the above mentioned problems. It is therefore an object of the present invention to provide a reproducing apparatus, which can efficiently store reproduction control data in a work memory, reduce the number of times of reading out data from a record disc, make a speed of a reproducing operation faster, drop a consumption power and make a life of an optical pickup movement mechanism longer.

The above object of the present invention can be achieved by a first reproducing apparatus provided with (i) a reading device for reading reproduction data and reproduction control data to control a reproduction of the reproduction data from a record disc, on which the reproduction data and the reproduction control data are recorded, (ii) a record medium having a plurality of memory areas, (iii) a data managing device for storing one reproduction control data read by the reading device into one of the memory areas, and (iv) a reproducing device for reproducing the reproduction data in accordance with the reproduction control data stored in the memory areas. In the first reproducing apparatus of the present invention, the data managing device is provided with: a retention priority memory for storing retention priority data, which indicate a retention priority as for each reproduction control data respectively stored in the memory areas; a selecting device for selecting one of the memory areas, into which the one reproduction control data read by the reading device is to be stored, on the basis of the retention priority data stored in the retention priority memory, when the one reproduction control data is read by the reading device; and a storing device for storing the one reproduced control data read by the reading device into the memory area selected by the selecting device.

According to the first reproducing apparatus of the present invention, when newly reading out the reproduction control data from the record disc and storing it into the record medium, the memory area in which the reproduction control data, whose retention priority is relatively low, is stored is selected as the memory area into which the newly read reproduction control data is to be stored. Then, this newly read reproduction control data is actually stored into this selected memory area. As a result, another reproduction control data which has been stored in this memory area is erased as the newly read reproduction control data replaces it. In other words, the memory area in which the reproduction control data, whose retention priority is relatively high, is stored is not selected. This implies that such reproduction control data (whose retention priority is relatively high) is maintained in the record medium as it is. This manner of selecting the memory area is performed on the basis of the retention priority data stored in the retention priority memory.

In this manner, it is possible to select the memory area while considering the usage frequency of the reproduction control data which can be expected in advance, so that it is possible to maintain the reproduction control data efficiently in the record medium.

The above object of the present invention can be also achieved by a second reproducing apparatus provided with (i) a reading device for reading reproduction data and reproduction control data to control a reproduction of the reproduction data from a record disc, on which the reproduction data and the reproduction control data are recorded, (ii) a record medium having a plurality of memory areas, (iii) a data managing device for storing one reproduction control data read by the reading device into one of the memory areas, and (iv) a reproducing device for reproducing the reproduction data in accordance with the reproduction control data stored in the memory areas. In the second reproducing apparatus of the present invention, the data managing device is provided with: a usage frequency memory for storing usage frequency data, which indicate the number of times of usage as for each reproduction control data respectively stored in the memory areas; a selecting device for selecting one of the memory areas, into which the one reproduction control data read by the reading device is to be stored, on the basis of the usage frequency data stored in the usage frequency memory, when the one reproduction control data is read by the reading device; and a storing device for storing the one reproduced control data read by the reading device into the memory area selected by the selecting device.

According to the second reproducing apparatus of the present invention, when newly reading out the reproduction control data from the record disc and storing it into the record medium, the memory area in which the reproduction control data, whose actual number of times of usage is relatively small, is stored is selected as the memory area into which the newly read reproduction control data is to be stored. Then, this newly read reproduction control data is actually stored into this selected memory area. As a result, another reproduction control data which has been stored in this memory area is erased as the newly read reproduction control data replaces it. In other words, the memory area in which the reproduction control data, whose actual number of times of usage is relatively large, is stored is not selected. This implies that such reproduction control data (whose actual number of times of usage is relatively large) is maintained in the record medium as it is. This manner of selecting the memory area is performed on the basis of usage frequency data stored in the retention priority memory.

In this manner, it is possible to select the memory area while considering the actual usage frequency of the reproduction control data (which may not be expected in advance), so that it is possible to maintain the reproduction control data efficiently in the record medium.

The above object of the present invention can be also achieved by a third reproducing apparatus provided with (i) a reading device for reading reproduction data and reproduction control data to control a reproduction of the reproduction data from a record disc, on which the reproduction data and the reproduction control data are recorded, (ii) a record medium having a plurality of memory areas, (iii) a data managing device for storing one reproduction control data read by the reading device into one of the memory areas, and (iv) a reproducing device for reproducing the reproduction data in accordance with the reproduction control data stored in the memory areas. In the third reproducing apparatus of the present invention, the data managing device is provided with: a retention priority memory for storing retention priority data, which indicate a retention priority as for each reproduction control data respectively stored in the memory areas; a usage frequency memory for storing usage frequency data, which indicate the number of times of usage as for each reproduction control data respectively stored in the memory areas; a selecting device for selecting one of the memory areas, into which the one reproduction control data read by the reading device is to be stored, on the basis of the retention priority data stored in the retention priority memory and the usage frequency data stored in the usage frequency memory, when the one reproduction control data is read by the reading device; and a storing device for storing the one reproduced control data read by the reading device into the memory area selected by the selecting device.

According to the third reproducing apparatus of the present invention, when newly reading out the reproduction control data from the record disc and storing it into the record medium, the memory area in which the reproduction control data, whose retention priority is relatively low and whose actual number of times of usage is relatively small, is stored is selected as the memory area into which the newly read reproduction control data is to be stored. Then, this newly read reproduction control data is actually stored into this selected memory area. As a result, another reproduction control data which has been stored in this memory area is erased as the newly read reproduction control data replaces it. In other words, the memory area in which the reproduction control data, whose retention priority is relatively high or whose actual number of times of usage is relatively large, is stored is not selected. This implies that such reproduction control data (whose retention priority is relatively high or whose actual number of times of usage is relatively large) is maintained in the record medium as it is. This manner of selecting the memory area is performed on the basis of the retention priority data stored in the retention priority memory and the usage frequency data stored in the retention priority memory.

In this manner, it is possible to select the memory area while considering the usage frequency of the reproduction control data which can be expected in advance and the actual usage frequency of the reproduction control data (which may not be expected in advance), so that it is possible to maintain the reproduction control data efficiently in the record medium. Especially, since the memory area is selected with considering the actual number of times of usage, even if it is difficult to expect the usage frequency of the reproduction control data in advance, it is possible to maintain the reproduction control data efficiently in the record medium.

In one aspect of the third reproducing apparatus of the present invention, the selecting device selects one of the memory areas, in which the reproduction control data corresponding to the lowest retention priority is stored, on the basis of the retention priority data stored in the retention priority memory, and if more than one memory areas are selected on the basis of the retention priority data, the selecting device further selects one of the selected more than one memory areas, in which the reproduction control data corresponding to the smallest number of times of usage is stored, on the basis of the usage frequency data stored in the usage frequency memory.

According to this aspect, when storing the newly read reproduction control data into the record medium, the memory area in which the reproduction control data, whose retention priority is the lowest and whose actual number of times of usage is the smallest, is stored is selected as the memory area into which the newly read reproduction control data is to be stored. Therefore, it is possible to maintain the reproduction control data efficiently in the record medium.

In one aspect of the first reproducing apparatus or another aspect of the third reproducing apparatus of the present invention, the data managing device is further provided with: a priority judging device for judging the retention priority as for the one reproduction control data when the one reproduction control data is stored into the memory area selected by the selecting device; and an updating device for updating the retention priority data stored in the retention priority memory in accordance with the retention priority judged by the priority judging device.

According to this aspect, each time when the reproduction control data read out from the record disc is stored into the selected memory area, the retention priority data is appropriately updated.

In this aspect, the reproduction data may be recorded on the record disc in such a condition that the reproduction data is divided into a plurality of blocks, and the priority judging device judges that the retention priority of the reproduction control data indicating a record position of a block of the reproduction data, is higher than that not-indicating the record position.

In this case, it is possible to maintain the reproduction control data, which indicates the record position of the block on the record disc, in the record medium for a long period of time. The reproduction control data indicating the record position of the block on the record disc is frequently used during the reproducing operation in the reproducing apparatus. Therefore, by maintaining such reproduction control data in the record medium for a long period of time, it is possible to always speedily read out such reproduction control data without performing the disc reading operation.

In one aspect of the second reproducing apparatus or another aspect of the third reproducing apparatus of the present invention, the data managing device is further provided with: an initializing device for initializing the number of times of usage as for the one reproduction control data when the one reproduction control data is stored into the memory area selected by the selecting device; and an incrementing device for incrementing the number of times of usage in the usage frequency data stored in the usage frequency memory each time when respective one reproduction control data stored in the memory areas is used.

According to this aspect, each time when the reproduction control data read out from the record disc is stored into the selected memory area, it is possible to initialize the number of times of usage corresponding to this memory area appropriately. Further, it is possible to accurately count the number of times of usage of the reproduction control data stored in this memory area, so that it is possible to accurately store this incremented result as the number of times of usage.

In another aspect of the first, second or third reproducing apparatus of the present invention, a data reading speed of the record medium is faster that that of the record disc.

According to this aspect, it is possible to make the reproducing operation in the reproducing apparatus faster, by maintaining the reproduction control data, whose usage frequency is high, efficiently in the record medium.

In another aspect of the first, second or third reproducing apparatus of the present invention, the record medium comprises a work memory used when an error correction process is performed onto data groups including the reproduction data and the reproduction control data.

According to this aspect, in case that the reproduction control data, whose usage frequency expected in advance is high or the actual number of times of usage is large, is included in a data group onto which the error correction process is performed, it is possible to maintain this data group in the work memory for a ling period of time.

Therefore, it is possible to speedily read out the reproduction control data, which is frequently used, from the work memory without performing the disc reading operation.

In another aspect of the first, second or third reproducing apparatus of the present invention, the record medium comprises a work memory used when the reproducing device is controlled by a controller in accordance with the reproduction control data.

According to this aspect, it is possible to maintain the reproduction control data, which is frequently used in the reproducing operation by the controller, in the work memory for a ling period of time. Therefore, it is possible to speedily read out the reproduction control data, which is frequently used, from the work memory without performing the disc reading operation.

In another aspect of the first, second or third reproducing apparatus of the present invention, the record medium comprises a first work memory used when an error correction process is performed onto data groups including the reproduction data and the reproduction control data, and a second work memory used when the reproducing device is controlled by a controller in accordance with the reproduction control data, and the data managing device stores the one reproduction control data into one of the memory areas in the first work memory and into one of the memory areas in the second work memory, independently from each other.

According to this aspect, it is possible to maintain a plurality of the reproduction control data, in the first and second work memories respectively for a ling period of time. Therefore, it is possible to speedily read out the reproduction control data, which is frequently used, from the first or second work memory without performing the disc reading operation. As a result, the reproducing operation speed is drastically increased, and the number of times of disc reading is drastically decreased.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings. In the following embodiments, the present invention is applied to a reproducing apparatus for the DVD.

Figure 1:
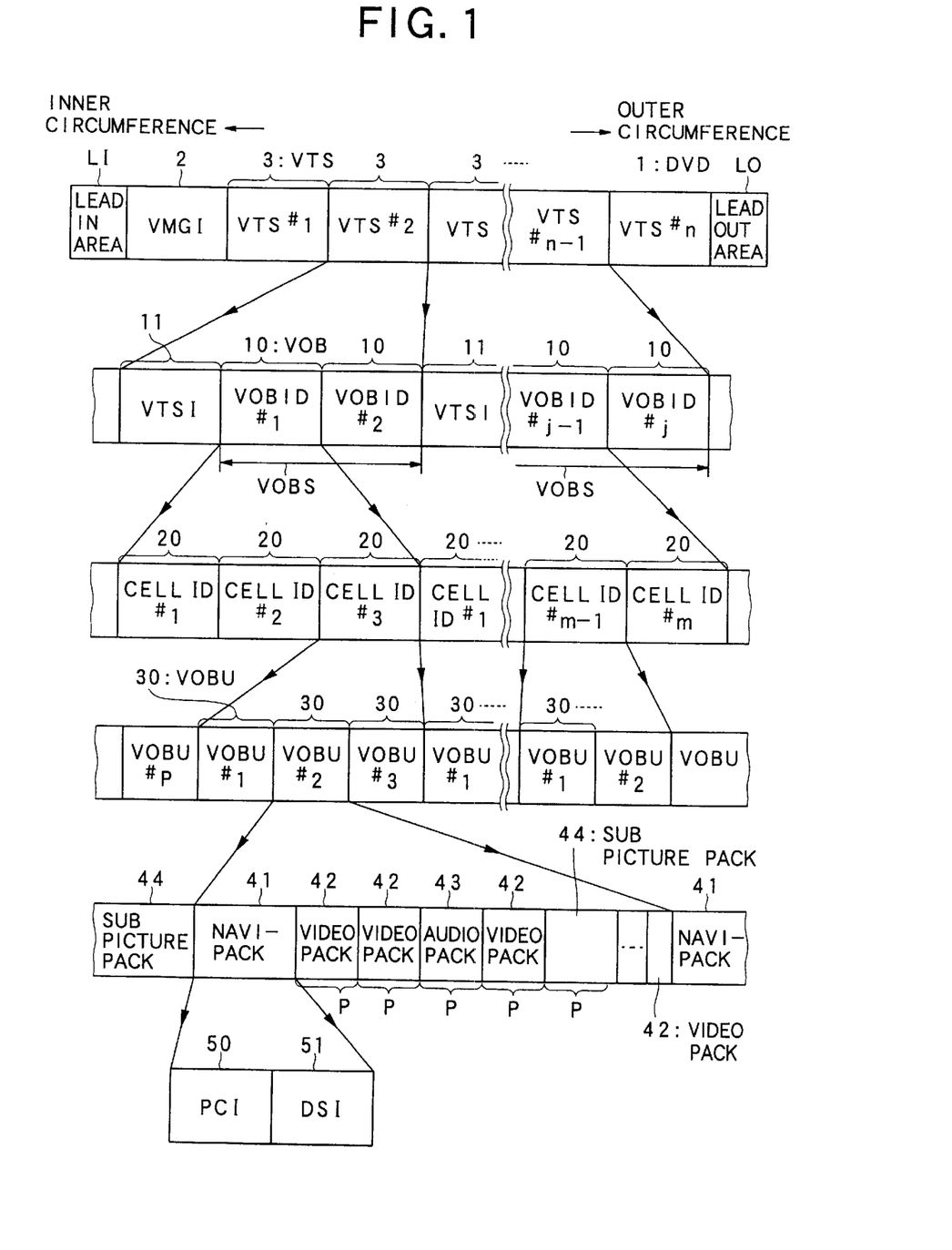
FIG. 1 is a diagram showing a record format of data recorded on a DVD 1 used in an embodiment of the present invention.

FIG. 1 shows a record format of data recorded on a DVD 1. As shown in FIG. 1, a lead-in area L1 is formed at an innermost circumference of the DVD 1, and a lead-out area LO is formed at an outermost circumference of the DVD 1. A data record area is formed between the lead-in area L1 and the lead-out area LO. In this data record area, reproduction data, such as video image, audio sound, subtitle and the like, as well as reproduction control data for controlling the reproduction of the reproduction data are recorded.

In the data record area, the reproduction data and the reproduction control data are divided into a plurality of VTSs (Video Title Sets) 3. The VTS 3 is a set in which the reproduction data and the reproduction control data related to one title are collected. The title corresponds to a work that an author or producer of a movie or the like presents an audience.

Figure 2:
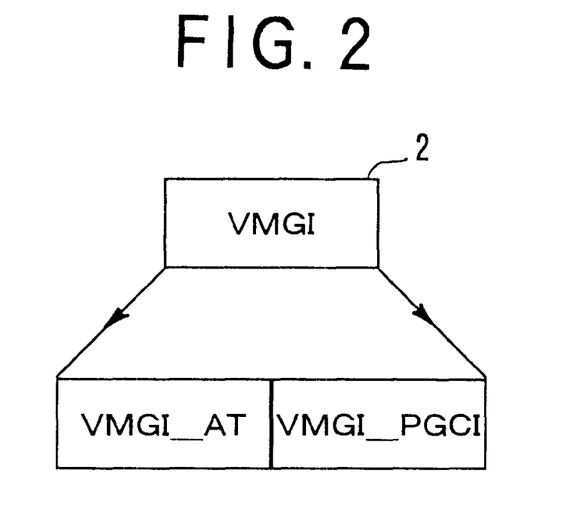
FIG. 2 is a diagram showing data included in a VMGI of FIG. 1.

Moreover, a VMGI (Video Manager Information) 2 is recorded at a lead of the data record area. The VMGI 2 is one of the reproduction control data. As shown in FIG. 2, the VMGI 2 includes at least an address table to search the VTS 3 and a PGCI (Program Chain Information). Hereafter, the address table included in the VMGI 2 is referred to as a VMGI_AT, and the PGCI included in the VMGI 2 is referred to as a VMGI_PGCI. In addition, the PGCI implies the reproduction control data with regard to a PGC (Program Chain) logically constituted by a combination of a plurality of programs in accordance with the intention of the author. Also, the program implies a set of data logically constituted by a combination of a plurality of cells 20.

Figure 3:
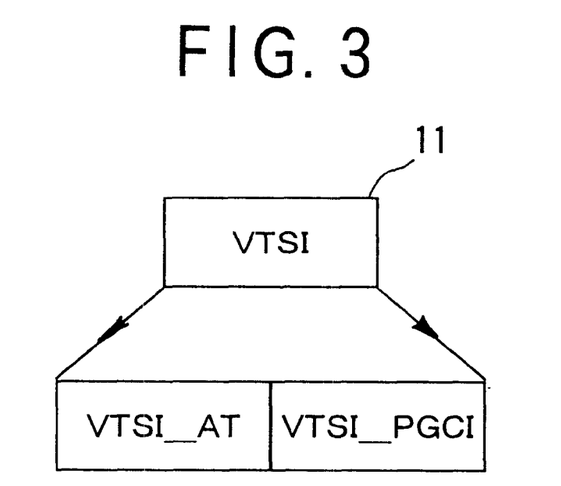
FIG. 3 is a diagram showing data included in a VTSI of FIG. 1.

In FIG. 1 again, each VTS 3 includes a VTSI (Video Title Set Information) 11 and a plurality of VOBs (Video Objects) 10. The VTSI 11 is placed at a lead of each VTS 3. The VTSI 11 is one of the reproduction control data. As shown in FIG. 3, the VTSI 11 includes an address table to search a PTT (Part of Title), an address table to search each cell 20 included in one VTS 3, an address table to search each VOBU (Video Object Unit) 30 included in one VTS 3 and a second PGCI. Hereafter, the plurality of address tables included in the VTSI 11 are collectively referred to as a VTSI_AT, and the PGCI included in the VTSI 11 is referred to as a VTSI_PGCI.

In FIG. 1 again, each VOB 10 is divided into the plurality of cells 20, and each cell 20 is further divided into a plurality of VOBUs 30. Each VOBU 30 has a navigation pack 41, a video pack 42, an audio pack 43 and a sub picture pack 44. The video pack 42 includes reproduction data (video data) to reproduce a video image. The audio pack 43 includes reproduction data (audio data) to reproduce an audio sound. The sub picture pack 44 includes reproduction data (sub picture data) to reproduce a subtitle and the like.

The navigation pack 41 is placed at a lead of each VOBU 30. The navigation pack 41 has a PCI (Presentation Control Information) 50 and a DSI (Data Search Information) 51. The PCI 50 has data to control an output of the reproduction data included in each pack. The DSI 51 has search data to search the reproduction data included in each pack for each predetermined detailed data unit.

Actually, several kinds of reproduction control data are stored on the DVD 1, in addition to the above-mentioned reproduction control data.

In the embodiment of the present invention, the reproduction control data is divided into two kinds of groups, in accordance with a usage frequency during the reproducing operation or a necessity of a fast reading out operation. That is, the VMGI_AT and the VTSI_AT are the address tables to search the VTS 3, the PTT and the like, so that they have the high necessity of the fast reading out operation when the reproducing operation is performed, and that the high usage frequency is expected in advance for them. On the other hand, in a case of the VMGI_PGCI and the VTSI_PGCI, the usage frequency is varied in accordance with the situation of the reproduction. On average, the VMGI_PGCI and the VTSI_PGCI have the usage frequency and the necessity of the fast reading out operation which are lower than those of the VMGI_AT and the VTSI_AT. From such viewpoints, the VMGI_AT and the VTSI_AT are referred to as an M group, and the VMGI_PGCI and the VTSI_PGCI are referred to as an N group. Moreover, the reproduction data (i.e., the video data, audio data and sub picture data) are referred to as a P group. Those group divisions are listed as follows.

TABLE 1

| | |
|---|---|
| M group | VMGI_AT |
| | VTSI_AT |
| N group | VMGI_PGCI |
| | VTSI_PGCI |
| P group | reproduction data |

Figure 4:
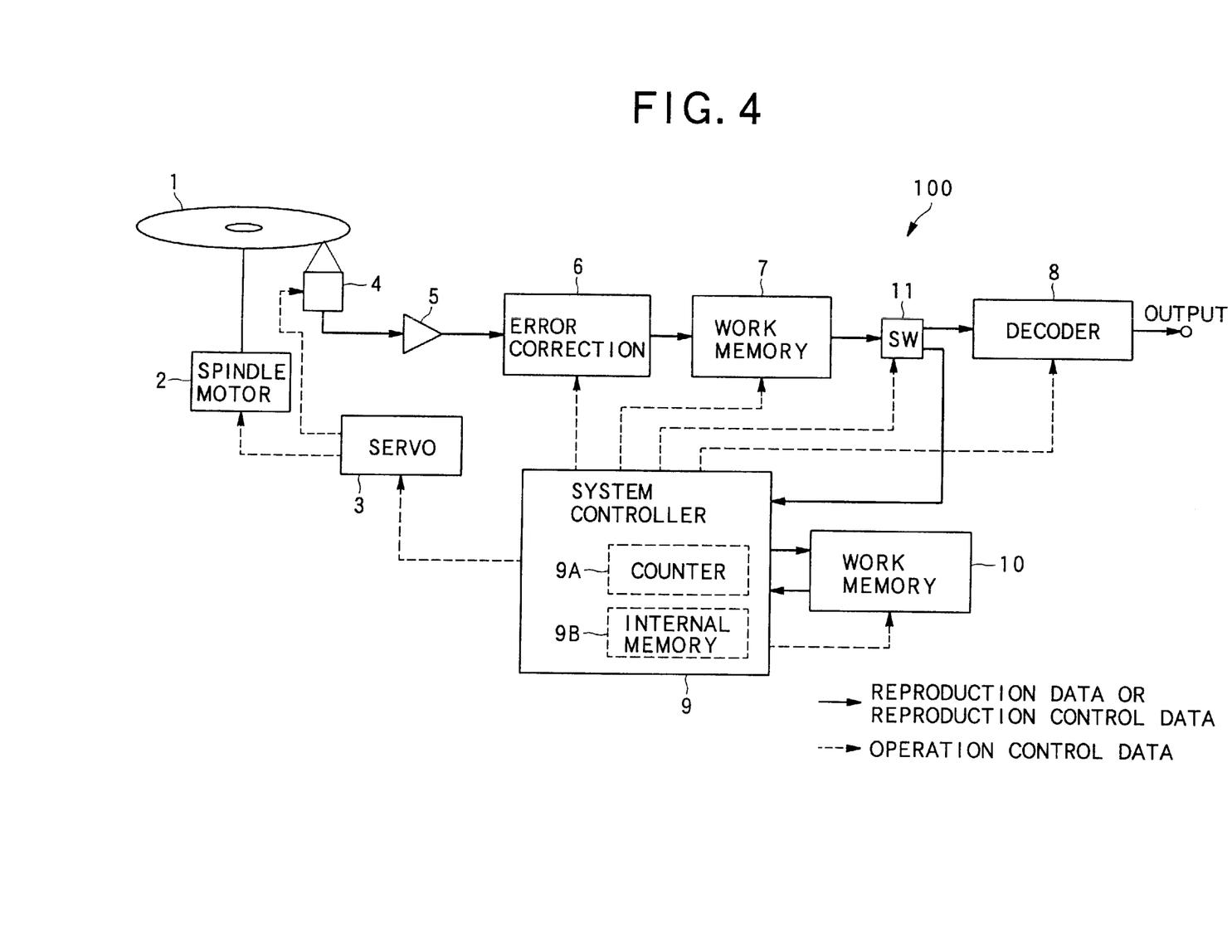
FIG. 4 is a block diagram showing a reproducing apparatus according to the embodiment of the present invention.

Next, FIG. 4 shows a reproducing apparatus 100 according to the embodiment of the present invention. As shown in FIG. 4, the reproducing apparatus 100 is provided with: a spindle motor 2 for rotating the DVD 1; a servo circuit 3 for servo-controlling the spindle motor 2 and an optical pickup 4; the optical pickup 4 for reading out reproduction data and reproduction control data from the DVD 1; an RF amplifier 5 for amplifying the data read out from the DVD 1; an error correction circuit 6 for performing an error correction process onto the data read out from the DVD 1; a first work memory 7 for the error correction (as one example of a record medium) for storing therein the reproduction data and the reproduction control data used for the error correction process; a decoder 8 for decoding the reproduction data; a system controller 9 for controlling the respective circuits and mechanisms included in the reproducing apparatus 100 and carrying out the reproducing operation; a second work memory 10 for the reproducing operation (as another example of a record medium) for storing the reproduction control data used during the reproducing operation; and a route switching switch 11.

The work memories 7 and 10 are re-writable and composed of memories, in which a reading speed is faster than that of reading the data from the DVD 1, such as a RAM or the like. The system controller 9 is composed of, for example, a CPU or the like, and has a counter 9A and an internal memory 9B.

The reproducing apparatus 100 carries out the reproducing operation as described below. When the DVD 1 is inserted into the reproducing apparatus 100, the servo circuit 3 firstly drives the spindle motor 2, which accordingly rotates the DVD 1. Moreover, the servo circuit 3 performs a movement control and a focus control of the optical pickup 4. Then, the optical pickup 4 irradiates a light beam onto the DVD 1, and further receives a reflection light thereof, and then reads the reproduction data and the reproduction control data recorded on the DVD 1, on the basis of this reflection light.

The reproduction data and the reproduction control data read from the DVD 1 are amplified by the RF amplifier 5 and are sent to the error correction circuit 6. Then, the error correction circuit 6 performs the error correction process onto the reproduction data and the reproduction control data. At this time, the reproduction data and the reproduction control data are transiently stored in the work memory 7 in accordance with a later-described data management process.

The reproduction data and the reproduction control data on which the error correction process has been performed are sent to the route switching switch 11. The switching operation of the route switching switch 11 enables the reproduction data to be sent to the decoder 8, and also enables the reproduction control data to be sent to the system controller 9. The switching operation of the route switching switch 11 is controlled by the system controller 9.

Then, the reproduction data is decoded by the decoder 8. The decoded reproduction data is sent to an output device (not shown), which accordingly enables a video image, an audio sound, a subtitle and the like corresponding to the reproduction data to be finally outputted.

On the other hand, the reproduction control data is used by the system controller 9, for the process necessary for the reproducing operation. Also, the reproduction control data sent to the system controller 9 is stored in the work memory 10, in accordance with the later-described data management process. Then, the reproduction control data stored in the work memory 10 is read out and is used by the system controller 9, as the occasion demands.

In order to carry out the above-mentioned reproducing operation, the system controller 9 sends an operation control signal to the servo circuit 3, the error correction circuit 6, the work memories 7 and 10, the decoder 8, the switch 11 and so on, and then controls those circuits through this operation control signal.

Here, the error correction process is described which is carried out by the error correction circuit 6. The reproducing apparatus 100 according to the embodiment of the present invention reads out the reproduction data and the reproduction control data recorded on the DVD 1, by a predetermined data unit. This data unit is referred to as a sector. The amount of data constituting one sector is 2064 bytes, and the amount of data other than the address information therein is 2048 bytes. The error correction process is executed for each ECC (Error Correction Code) block composed of 16 sectors. Thus, if there is a necessity of reading out the reproduction control data of one byte from the DVD 1, it is necessary to read out not only the sector including the reproduction control data of the one byte but also the other 15 sectors constituting the ECC block including that sector. In addition, the error correction process using the ECC block composed of the 16 sectors is a process typically used in a technical field with regard to the DVD.

Figure 5:
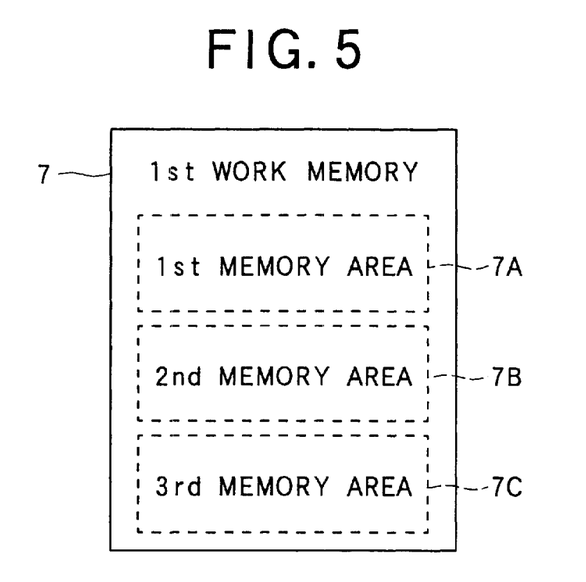
FIG. 5 is a diagram showing an inner structure of a first work memory in the embodiment of the present invention.

FIG. 5 shows the inner structure of the first work memory 7. As shown in FIG. 5, the work memory 7 has three memory areas 7A to 7C. The capacity of each of the memory areas 7A, 7B and 7C is equal to a total data amount of the ECC block composed of the 16 sectors. Thus, the work memory 7 can store therein the three ECC blocks at the same time.

When the ECC block is written into the work memory 7, the system controller 9 selects any one memory area from the three memory areas 7A to 7C. Then, the ECC block is stored into this selected memory area. A bank switching method may be used to select such a memory area. Also, a memory area may be selected by using the similar method when the necessary data is read out from among the respective ECC blocks stored in the memory areas 7A to 7C.

The number of the memory areas of the work memory 7 is not limited to 3. It may be two or four or more. When the error correction process is performed on one ECC block, in a case of requiring a memory area whose capacity is greater than the total data amount of the ECC block, the capacities of the respective memory areas 7A, 7B and 7C are set so as to satisfy such requirement.

Figure 6:
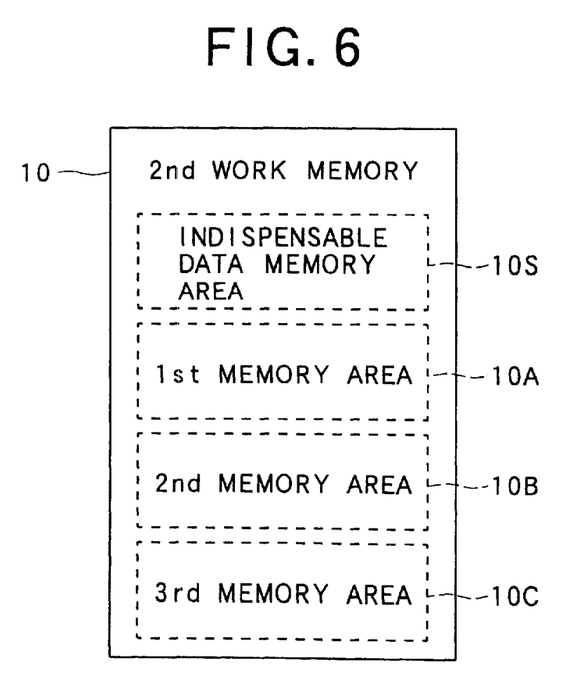
FIG. 6 is a diagram showing an inner structure of a second work memory in the embodiment of the present invention.

Next, FIG. 6 shows the inner structure of the second work memory 10. As shown in FIG. 6, the work memory 10 has three memory areas 10A to 10C and an indispensable data memory area 10S. The capacity of each of the memory areas 10A, 10B and 10C is equal to a data amount of one sector. Thus, the work memory 10 can store therein the three sectors at the same time. The memory area may be selected by the bank switching method when the data is written into or read out from the work memory 10.

The number of the memory areas (except the indispensable data memory area 10S) of the work memory 10 is not limited to 3. So, it may be 2 or 4 or more. Also, the method for selecting the memory area in the work memories 7 and 10 is not limited to the bank switching method. For example, an access pointer changing method or a data transferring method may be employed.

The indispensable data memory area 10S of the work memory 10 is a memory area to store therein data in which a usage frequency for the reproducing operation is expected to be very high, or data having a high necessity that it is always retained to reproduce one DVD. The data stored in this area is retained until the DVD is taken away from the reproducing apparatus 100 or until a power source of the reproducing apparatus 100 is turned off, while the data is read out as the occasion demand.

The data management process executed by the system controller 9 of the reproducing apparatus 100 according to the embodiment of the present invention will be described below.

In this data management process, the system controller 9 executes two kinds of data management processes. A first data management process is a management process with regard to the ECC blocks stored in the memory areas 7A to 7C of the first work memory 7. A second data management process is a management process with regard to the reproduction control data stored in the memory areas 10A to 10C of the second work memory 10.

The system controller 9 uses the following management data when carrying out the first data management process.

As shown in the table 2, the group identification flags Fa1 to Fa3 and the number of times of usage Ca1 to Ca3 correspond to the three memory areas 7A to 7C of the work memory 7, respectively.

TABLE 2

| | Management Data | |
|---|---|---|
| | Group Identification Flag Fa | Number of Times of Usage Ca |
| First Memory Area 7A | Fa1 | Ca1 |
| Second Memory Area 7B | Fa2 | Ca2 |
| Third Memory Area 7C | Fa3 | Ca3 |

Each of the group identification flags Fa1, Fa2 and Fa3 is a flag indicating that the ECC block stored in the corresponding memory area 7A, 7B or 7C is stored in the memory area in order to use the data belonging to one group among the M, N and P groups. For example, the group identification flag Fa1 is set to "0" if the ECC block recorded in the memory area 7A is read out from the DVD 1 in order to use the data belonging to the M group and then stored in the memory area 7A. Also, the group identification flag Fa1 is set to "1" if the ECC block recorded in the memory area 7A is read out from the DVD 1 in order to use the data belonging to the N group and then stored in the memory area 7A. On the other hand, the group identification flag Fa1 is set to "2" if the ECC block recorded in the memory area 7A is read out from the DVD 1 in order to use the data (reproduction data) belonging to the P group and then stored into the memory area 7A. The similar setting is done in the cases of the group identification flags Fa2 and Fa3.

Each of the number of times of usage Ca1, Ca2 and Ca3 is a numeral indicating the number of times of usage with regard to the data included in the ECC block stored in the corresponding memory area 7A, 7B or 7C during the reproducing operation.

Moreover, the system controller 9 uses the following management data when carrying out the second data management process.

TABLE 3

| | Management Data | |
|---|---|---|
| | Group Identification Flag Fb | Number of Times of Usage Cb |
| First Memory Area 10A | Fb1 | Cb1 |
| Second Memory Area 10B | Fb2 | Cb2 |
| Third Memory Area 10C | Fb3 | Cb3 |

As shown in the table 3, the group identification flags Fb1 to Fb3 and the number of times of usage Cb1 to Cb3 correspond to the three memory areas 10A to 10C of the work memory 10, respectively.

Each of the group identification flags Fb1, Fb2 and Fb3 is a flag indicating one group among the above-mentioned M and N groups to which the reproduction control data stored in the corresponding memory area 10A, 10B or 10C belongs. For example, the group identification flag Fb1 is set to "0" if the reproduction control data stored in the memory area IOA belongs to the M group. On the other hand, the group identification flag Fb1 is set to "1" if the reproduction control data stored in the memory area 10A belongs to the N group. The similar setting is also done in the cases of the group identification flags Fb2 and Fb3.

Each of the number of times of usage Cb1, Cb2 and Cb3 is a numeral indicating the number of times of usage with regard to the reproduction control data stored in the corresponding memory area 10A, 10B or 10C during the reproducing operation.

The above-mentioned group identification flags and numbers of times of usage are respectively stored in the internal memory 9B of the system controller 9. Also, the number of times of usage of the reproduction control data is counted (incremented) by using the counter 9A built in the system controller 9.

Figure 7:
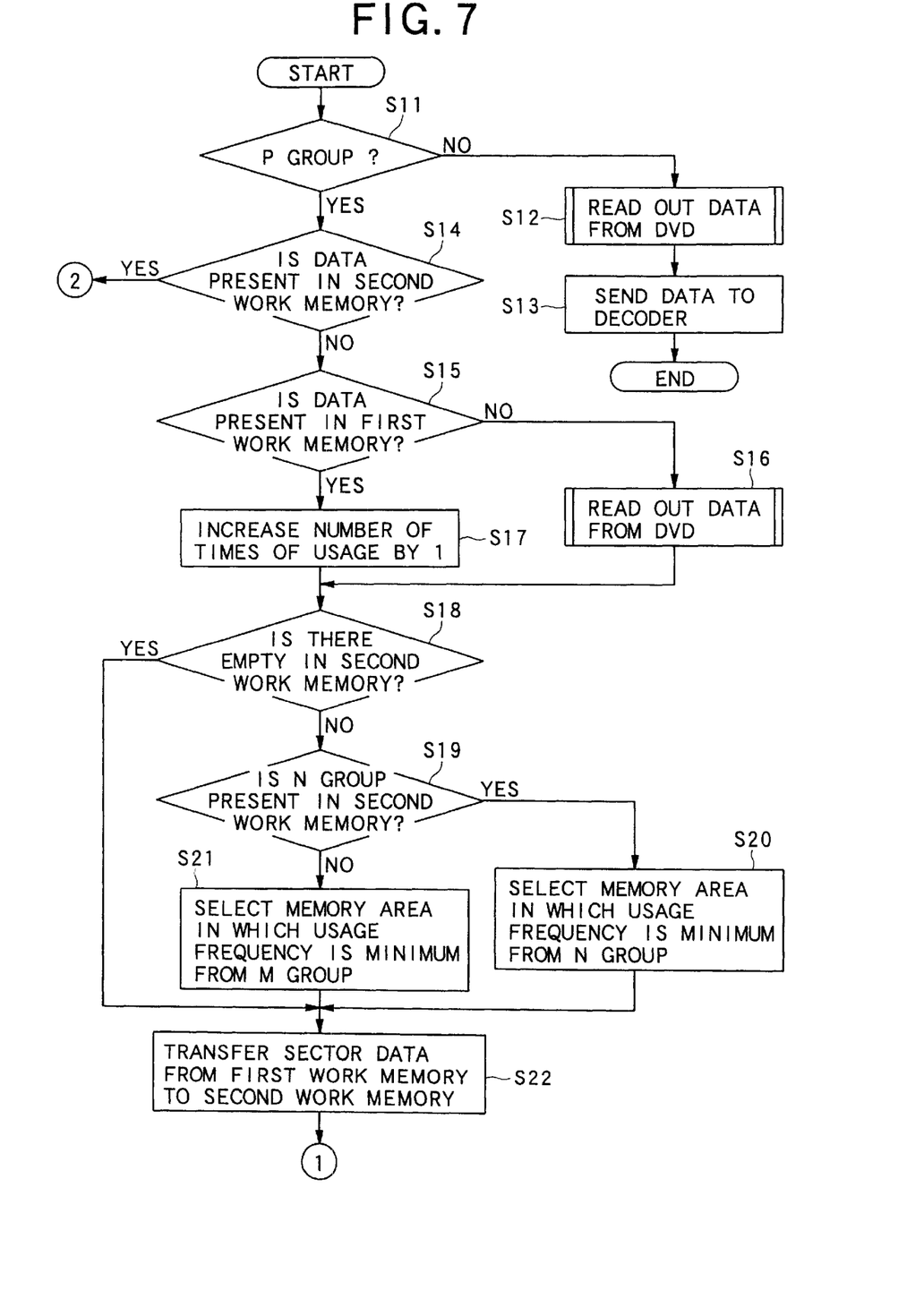
FIG. 7 is a flowchart showing a data management process in the embodiment of the present invention.
Figure 8:
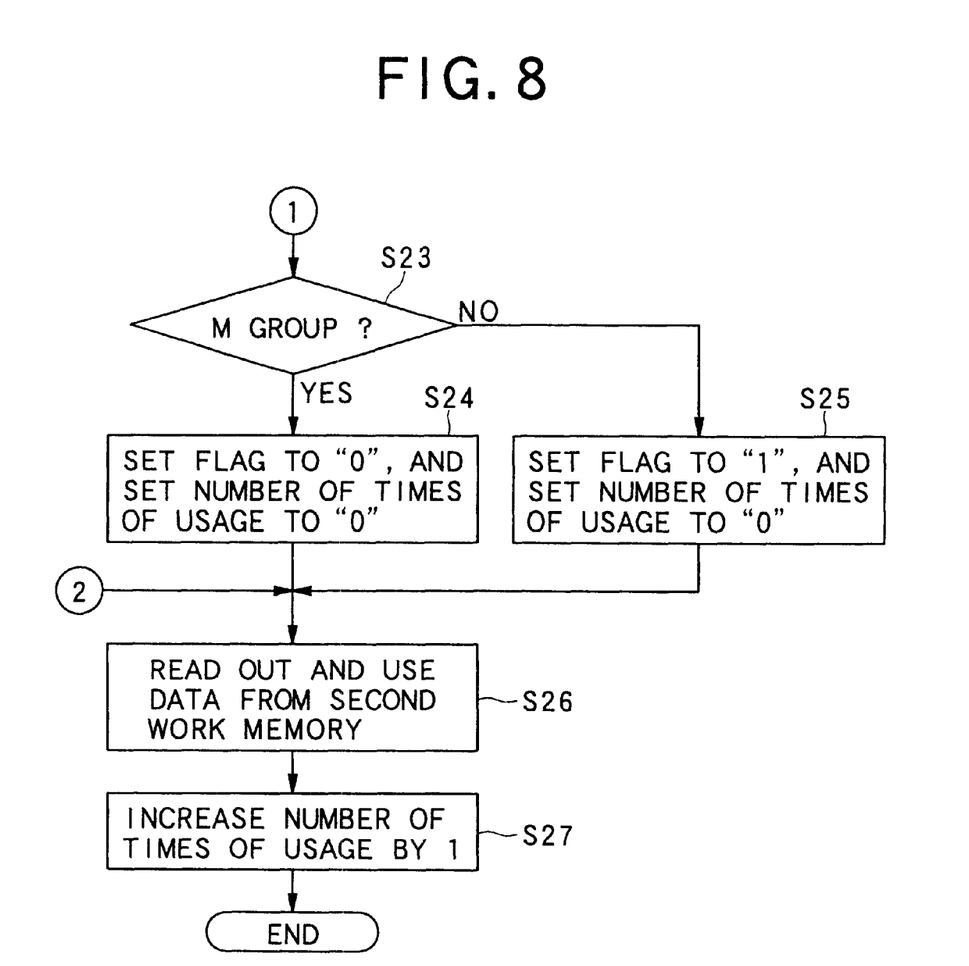
FIG. 8 is a flowchart showing a data management process in the embodiment of the present invention.
Figure 9:
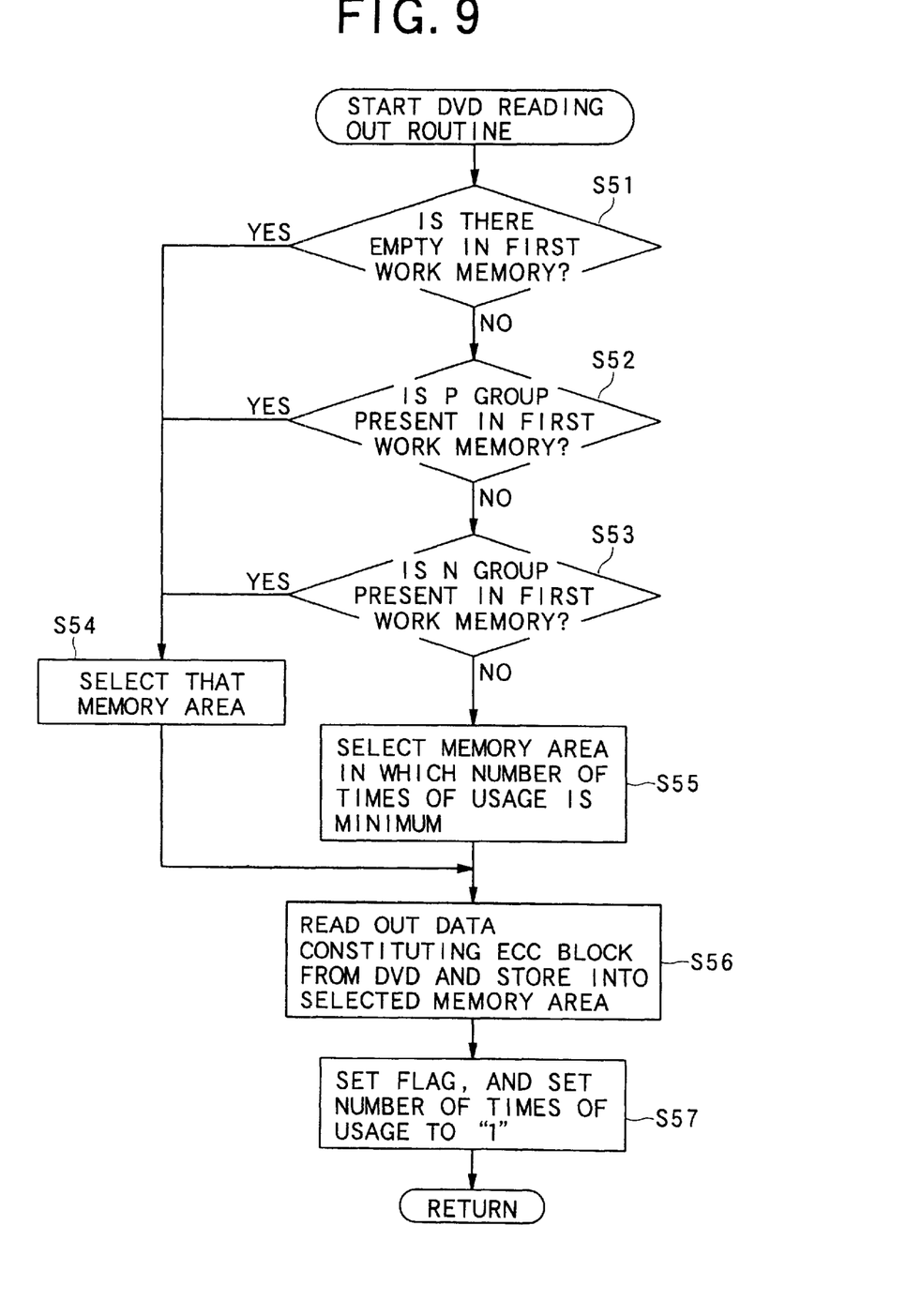
FIG. 9 is a flowchart showing a routine of reading out from DVD in a data management process in the embodiment of the present invention.

FIG. 7 to FIG. 9 are flowcharts showing the data management process in the reproducing apparatus 100. The data management process will be described below in detail with reference to those flowcharts.

When the reproducing operation is started, all the group identification flags Fa are set to "3" (i.e., an initial value). All the group identification flags Fb are set to "2" (i.e., an initial value). Further, all the numbers of times of usage Ca and Cb are initialized to "0".

When the use of the reproduction data or the reproduction control data is requested during the DVD reproducing operation, the system controller 9 starts the data management process shown in FIG. 7. As shown in FIG. 7, the system controller 9 firstly judges whether or not the data targeted for the usage request belongs to the P group (Step S11).

If the data targeted for the usage request is the data belonging to the P group (Step S11:YES) i.e., the reproduction data, the system controller 9 executes a DVD reading out routine shown in FIG. 9, in order to read out this reproduction data from the DVD (Step S12).

In the DVD reading out routine shown in FIG. 9, the system controller 9 firstly judges whether or not a non-used memory area is present in the memory areas 7A to 7C of the first work memory 7 (Step S51). This judgment can be done by investigating whether or not a flag set to "3" (the initial value) is present in the group identification flags Fa1, Fa2 and Fa3 stored in the internal memory 9B of the system controller 9. If the non-used memory area is present (Step S51: YES), the system controller 9 selects this non- used memory area, as the memory area to store a newly read ECC block (Step S54).

On the other hand, if the non-used memory area is not present in the memory areas 7A to 7C (Step S51:NO), the system controller 9 judges whether or not any of the memory areas 7A to 7C has a memory area which stores therein an ECC block read out in order to use the data belonging to the P group (Step S52). This judgment can be done by investigating whether or not a flag set to "2" is present in the group identification flags Fa1, Fa2 and Fa3 stored in the internal memory 9B. If such an ECC block is present (Step S52:YES), the system controller 9 selects this memory area which stores this ECC block, as the memory area to store a newly read ECC block (Step S54). In addition, the selection of the memory area implies to erase the data stored in this selected memory area.

On the other hand, if there is no memory area that stores therein the ECC block, which has been read out in order to use the data belonging to the P group at the step S52 (Step S52: NO), the system controller 9 judges whether or not any of the memory areas 7A to 7C has a memory area which stores therein an ECC block read out in order to use the data belonging to the N group (Step S53). This judgment can be done by investigating whether or not a flag set stored in the internal memory 9B of the system controller 9. If such an ECC block is present (Step S53:YES), the system controller 9 selects the memory area which stores this ECC block, as the memory area to store a newly read ECC block (Step S54).

On the other hand, if any of the memory areas 7A to 7C does not have the memory area that stores therein the ECC block, which has been read out in order to use the data belonging to the N group at the step S53, the system controller 9 recognizes that only the memory areas storing therein the ECC blocks read out in order to use the data belonging to the M group are present in the memory areas 7A to 7C. Then, the system controller 9 selects a memory area in which the number of times of usage is the minimum from among the ECC blocks stored in the memory areas 7A to 7C (Step S55). This selection can be done by respectively comparing the numbers of times of usage Ca1, Ca2 and Ca3 stored in the internal memory 9B with each other.

Then, the system controller 9 reads out the reproduction control data targeted for the use, which constitutes the ECC block including the reproduction data targeted for the usage request, from the DVD 1, and then over-writes it onto the selected memory area (Step S56). At this time, the data, which has been stored in this memory area until that time, is erased. In succession, the system controller 9 sets the group identification flag Fa2 corresponding to the selected memory area to "2", and sets the corresponding number of times of usage Ca to "1" (Step S57). Accordingly, the DVD reading out routine is ended, and the process returns to the step S13 of FIG. 7.

The error correction circuit 6 performs the error correction process onto the ECC block newly stored in any of the memory areas 7A to 7C of the work memory 7. Then, the system controller 9 extracts the reproduction data targeted for the usage request, from this ECC block, and then sends it to the decoder 8 (Step S13 of FIG. 7).

On the other hand, if the data targeted for the usage request is not the data belonging to the P group at the step S11 of FIG. 7, namely, if the data targeted for the usage request is the reproduction control data, the system controller 9 judges whether or not the reproduction control data targeted for the usage request is present in any one of the memory areas 10A to 10C in the second work memory 10 (Step S14).

This judgment is done as follows. For example, when a sector including the reproduction control data is stored into the memory areas 10A to 10C, the address information indicative of that sector is stored into the internal memory 9B. Then, when the above-mentioned judgment is done, it is investigated whether or not there is the address information stored in the internal memory 9B that coincides with the address information of the sector including the reproduction control data targeted for the usage request. If there is the address information coinciding with it, this coincidence implies that the reproduction control data targeted for the usage request is stored in one of the memory areas 10A to 10C. Moreover, if the address information and the corresponding relation to the memory area that stores therein the sector indicated by this address information are stored in the internal memory 9B, it is possible to specify the memory area that stores therein the reproduction control data targeted for the usage request, from among the memory areas 10A to 10C.

If the reproduction control data targeted for the usage request is not present in any of the memory areas 10A to 10C, the system controller 9 judges whether or not the reproduction control data targeted for the usage request is present in any of the memory areas 7A to 7C of the first work memory 7 (Step S15). This judgment is done by using the method similar to that of the step S14.

If the reproduction control data targeted for the usage request is not present in any of the memory areas 7A to 7C (Step S15:NO), the system controller 9 executes the DVD reading out routine, in order to read out this reproduction control data from the DVD (Step S16). In addition, a group identification flag corresponding to the read out reproduction control data is set at the step S57 in this DVD reading out routine. As a result, the data corresponding to the 16 sectors constituting the ECC block including the reproduction control data targeted for the usage request is stored into one of the memory areas 7A to 7C of the work memory 7.

On the other hand, if the reproduction control data targeted or the usage request is present in one of the memory areas 7A to 7C in the first work memory 7 (Step S15:YES), the number of times of usage for this memory area is incremented by 1 (Step S17).

Next, in order to transfer the sector including the reproduction control data targeted for the usage request from this newly stored ECC block, from the work memory 7 to the work memory 10, the system controller 9 firstly judges whether or not a non-used memory area is present in the memory areas 10A to 10C of the second work memory 10 (Step S18). This judgment can be done by investigating whether or not a flag set to "2" (an initial value) is present in the group identification flags Fb1, Fb2 and Fb3 stored in the internal memory 9B of the system controller 9. If the non-used memory area is present in the memory areas 10A to 10C (Step S18:YES), the system controller 9 selects this memory area.

On the other hand, if the non-used memory area is not present in the memory areas 10A to 10C at the step S18 (Step S18:NO), the system controller 9 judges whether or not any of the memory areas 10A to 10C of the second work memory 10 has a memory area which stores therein a sector including the reproduction control data belonging to the N group (Step S19). This judgment can be done by investigating whether or not a flag set to "1" is present in the group identification flags Fb1, Fb2 and Fb3 stored in the internal memory 9B of the system controller 9. If there are a plurality of memory areas which store therein the sector including the reproduction control data belonging to the N group, the system controller 9 selects a memory area, in which the number of times of usage is the minimum, from among those memory areas (Step S20). This selection can be done by comparing the numbers of times of usage stored in the internal memory 9B.

On the other hand, if there is not the memory area that stores therein the sector including the reproduction control data belonging to the N group at the step S19 (Step S19:NO), the system controller 9 recognizes that only the memory area which stores therein the sector including the reproduction control data belonging to the M group is present in the memory areas 10A to 10C. Then, the system controller 9 selects a memory area in which the number of times of usage is the minimum, from among those memory areas (step S21). This selection can be done by comparing the numbers of times of usage Cb1, Cb2 and Cb3 stored in the internal memory 9B.

Next, the system controller 9 transfers the sector including the reproduction control data targeted for the usage request, from the first work memory 7 to the selected memory area in the second work memory 10 (Step S22). At this time, the data stored in this memory area until that time is erased.

Next, as shown in FIG. 8, the system controller 9 judges whether or not the reproduction control data included in the presently transferred sector belongs to the M group (Step S23). If this reproduction control data belongs to the M group (Step S23:YES), the system controller 9 sets the group identification flag Fa corresponding to the memory area that stores therein the sector including this reproduction control data to "0", and initializes the corresponding number of times of usage Ca to "0" (Step S24). On the other hand, if this reproduction control data does not belong to the M group (Step S23:NO) i.e., if this reproduction control data belongs to the N group, the system controller 9 sets the corresponding group identification flag Fa to "1", and initializes the corresponding number of times of usage Ca to "0" (Step S24).

Then, the system controller 9 reads out the presently stored reproduction control data from the second work memory 10, and uses it for the control of the reproducing operation (Step S26). Moreover, the system controller 9 increments the number of times of usage Cb in the memory area, which stores therein the sector including the presently used reproduction control data, by 1 (Step S27).

On the other hand, if the sector including the reproduction control data targeted for the usage request is already stored in any of the memory areas 10A to 10C of the second work memory 10 at the step S14 (Step S14:YES), the system controller 9 immediately reads out this reproduction control data from the second work memory 10, and uses it for the control of the reproducing operation (Step S26). Moreover, the system controller 9 increments the number of times of usage Cb of the memory area, which stores therein the sector including the presently used reproduction control data, by 1 (Step S27).

According to the above-mentioned data management process, the reproduction control data belonging to the M group is more preferentially retained in the work memory 7 or 10 than the reproduction control data belonging to the N group and the reproduction data belonging to the P group. The reproduction control data belonging to the M group is the VMGI_AT and the VTSI_AT for example. Those reproduction control data have the high necessity of the fast reading out operation when the reproducing operation is performed, as mentioned above, and they are the data in which the usage frequency is expected to be high. Such retention of the reproduction control data in the work memory 7 or 10 enables those data to be read out from the work memory 7 or 10 at the fast speed, and they can be quickly used for the control of the reproducing 100 operation.

Figure 10:
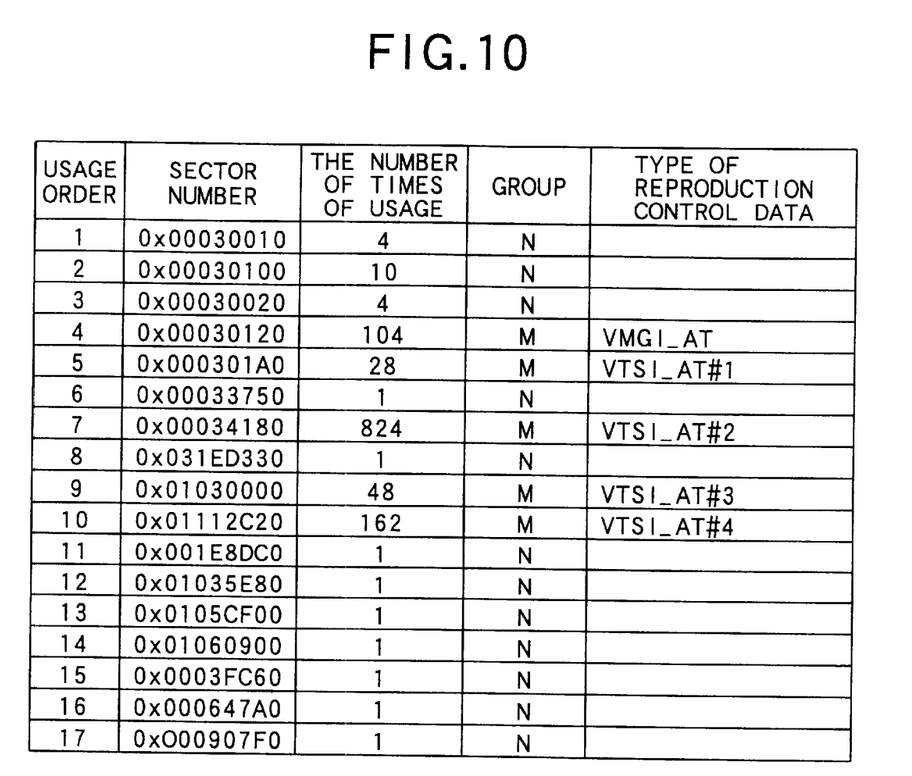
FIG. 10 is a diagram showing a result obtained from an experiment of reading out the data from the DVD in the embodiment of the present invention.

FIG. 10 shows the result of performing a series of reproducing operations from the insertion of the DVD 1 through the display of an initial menu screen and the selection of a title to the start of the reproduction of the selected title by using the reproducing apparatus 100, and then outputting the reproduction control data, which are accordingly read out from the DVD 1 and used for the reproducing operation, by using an output device for experiment. In FIG. 10, a column of a "usage order" indicates the order when each reproduction control data is firstly used. In addition, when the reproducing apparatus 100 is used to carry out the DVD reproduction, the reproduction data is read out together with the reproduction control data. However, this operation is omitted in FIG. 10.

According to the result shown in FIG. 10, the number of times of usage of VMGI_AT is 104. That of VTSI_AT#1 (VTSI_AT placed in VTS#1 of FIG. 1) is 28. That of VTSI_AT#2 is 824. That of VTSI_AT#3 is 48. And, that of VTSI_AT#4 is 162. On the contrary, all the numbers of times of usage of the reproduction control data belonging to the N group are 1 to 10. As mentioned above, it is understood that the reproduction control data belonging to the M group is higher in the usage frequency than the reproduction control data belonging to the N group.

In this way, in the reproducing apparatus 100 according to this embodiment, the reproduction control data is grouped in accordance with the necessity of the fast reading out operation and the usage frequency which may be expected in advance. Then, the priority of storing and retaining the reproduction control data in the work memory 7 or 10 is changed depending on the group to which the reproduction control data belongs. Accordingly, the reproduction control data whose usage frequency is expected to be high can be retained in the work memory 7 or 10 for a long time, which can improve the usage efficiencies of the work memories 7 and 10 and also make the operation for reading out the reproduction control data faster. Thus, it is possible to attain the quick reproducing operation.

Moreover, in this embodiment, the actual number of times of usage of the reproduction control data is counted. So, the priority of storing and retaining the reproduction control data in the work memory 7 or 10 is judged also in accordance with the number of times of usage obtained as that result. Accordingly, the reproduction control data that may be actually used in many times can be retained in the work memory 7 or 10 for a long time, even if it is difficult to expect the reproduction control data having the high usage frequency, since the kind or structure of the reproduction control data recorded on the DVD is changed in accordance with the intention of the author of the DVD or the situation of the reproducing operation is variously changed as the user operates the reproducing apparatus.

As mentioned above, the reproducing apparatus 100 according to the embodiment of the present invention judges the priority of retaining the reproduction control data in the work memory 7 or 10 while considering both the usage frequency of the reproduction control data that may be expected in advance and the actual number of times of usage of the reproduction control data. Thus, the reproduction control data can be very effectively stored and retained in the work memory 7 or 10. Hence, it is possible to reduce the number of times of reading out the data from the record disc, make the reproducing operation faster, drop the consumption power, and make the life of the pickup movement mechanism longer. Moreover, it is not necessary to increase the capacities of the work memories 7 and 10 in order to attain the above-mentioned effects.

By the way, in the embodiment, it is described that the management data shown in the tables 2 and 3 are stored in the internal memory 9B of the system controller 9. However, the present invention is not limited to that case. For example, the management data shown in the table 2 may be stored in the work memory 7, and the management data shown in the table 3 may be stored in the work memory 10.

Also, in the embodiment, the case is exemplified in which the data manager shown in FIGS. 7 to 9 is applied to both the work memories 7 and 10. However, the present invention is not limited to that case. So, the data manager may be applied to any one of the work memories 7 and 10.

In the embodiment, it is described that the work memories 7 and 10 are separated from each other. However, those work memories may be integrated into a single unit by using one memory. Also, the work memory may be composed of internal memories in the system controller.

Moreover, in the embodiment, the DVD is exemplified as the memory disc. However, the present invention is not limited to that example. It may be applied to a reproducing apparatus for reproducing another memory disc, such as a CD, an MD and the like. Also, the present invention may be applied to a recording apparatus for storing data onto a record disc.

Incidentally, in the embodiment, the system controller 9 for carrying out the data management process shown in FIG. 7 to FIG. 9 corresponds to the actual example of the data managing device. The step S24, S25 or S57 in FIGS. 7 and 9 corresponds to the actual example of the retention priority memory. The step S17, S24, S25, S27 or S57 corresponds to the actual example of the usage frequency memory for storing the number of times of usage. The step S20, S21, S54 or S55 corresponds to the actual example of the selecting device. The step S22 or S56 corresponds to the actual example of the storing device. The step S23 or S57 corresponds to the actual example of the priority judging device. Also, the respective values of the group identification flags Fa1 to Fa3 and Fb1 to Fb3 correspond to the actual examples of the retention priority data. The respective numbers of times of usage Ca1 to Ca3 and Cb1 to Cb3 correspond to the actual examples of the usage frequency data.

As detailed above, the present invention can select the memory area while considering at least one of the usage frequency of the reproduction control data that may be expected in advance and the actual number of times of usage of the reproduction control data. Thus, the reproduction control data can be efficiently retained in the work memory. Hence, it is possible to reduce the number of times of reading out the data from the record disc, make the reproducing operation faster, drop the consumption power, and make the life of the pickup movement mechanism longer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-151352 filed on May 31, 1999 including the specification, claims, drawings and summary is incorporated herein by reference in its entirety.

What is claimed is:

1. A reproducing apparatus comprising
   (i) a reading device for reading reproduction data and reproduction control data to control a reproduction of the reproduction data from a record disc, on which the reproduction data and the reproduction control data are recorded,
   (ii) a record medium having a plurality of memory areas,
   (iii) a data managing device for storing one reproduction control data read by said reading device into one of the memory areas, and
   (iv) a reproducing device for reproducing the reproduction data in accordance with the reproduction control data stored in the memory areas,
   said data managing device comprising:
      a retention priority memory for storing retention priority data, which indicate a retention priority as for each reproduction control data respectively stored in the memory areas;
      a selecting device for selecting one of the memory areas, into which the one reproduction control data read by said reading device is to be stored, on the basis of the retention priority data stored in said retention priority memory, when the one reproduction control data is read by said reading device; and
      a storing device for storing the one reproduced control data read by said reading device into the memory area selected by said selecting device.

2. An apparatus according to claim 1, wherein said data managing device further comprises:
   a priority judging device for judging the retention priority as for the one reproduction control data when the one reproduction control data is stored into the memory area selected by said selecting device; and
   an updating device for updating the retention priority data stored in said retention priority memory in accordance with the retention priority judged by said priority judging device.

3. An apparatus according to claim 2, wherein
   the reproduction data is recorded on said record disc in such a condition that the reproduction data is divided into a plurality of blocks, and
   said priority judging device judges that the retention priority of the reproduction control data indicating a record position of a block of the reproduction data, is higher than that not-indicating the record position.

4. An apparatus according to claim 1, wherein a data reading speed of said record medium is faster that that of the record disc.

5. An apparatus according to claim 1, wherein said record medium comprises a work memory used when an error correction process is performed onto data groups including the reproduction data and the reproduction control data.

6. An apparatus according to claim 1, wherein said record medium comprises a work memory used when said reproducing device is controlled by a controller in accordance with the reproduction control data.

7. An apparatus according to claim 1, wherein
   said record medium comprises a first work memory used when an error correction process is performed onto data groups including the reproduction data and the reproduction control data, and a second work memory used when said reproducing device is controlled by a controller in accordance with the reproduction control data, and
   said data managing device stores the one reproduction control data into one of the memory areas in said first work memory and into one of the memory areas in said second work memory, independently from each other.

8. A reproducing apparatus comprising
   (i) a reading device for reading reproduction data and reproduction control data to control a reproduction of the reproduction data from a record disc, on which the reproduction data and the reproduction control data are recorded,
   (ii) a record medium having a plurality of memory areas,
   (iii) a data managing device for storing one reproduction control data read by said reading device into one of the memory areas, and
   (iv) a reproducing device for reproducing the reproduction data in accordance with the reproduction control data stored in the memory areas,
   said data managing device comprising:
      a retention priority memory for storing retention priority data, which indicate a retention priority as for each reproduction control data respectively stored in the memory areas;
      a usage frequency memory for storing usage frequency data, which indicate the number of times of usage as for each reproduction control data respectively stored in the memory areas;
      a selecting device for selecting one of the memory areas, into which the one reproduction control data read by said reading device is to be stored, on the basis of the retention priority data stored in said retention priority memory and the usage frequency data stored in said usage frequency memory, when the one reproduction control data is read by said reading device; and
      a storing device for storing the one reproduced control data read by said reading device into the memory area selected by said selecting device.

9. An apparatus according to claim 8, wherein said selecting device selects one of the memory areas, in which the reproduction control data corresponding to the lowest retention priority is stored, on the basis of the retention priority data stored in said retention priority memory, and if more than one memory areas are selected on the basis of the retention priority data, said selecting device further selects one of the selected more than one memory areas, in which the reproduction control data corresponding to the smallest number of times of usage is stored, on the basis of the usage frequency data stored in said usage frequency memory.

10. An apparatus according to claim 9, wherein said data managing device further comprises:

a priority judging device for judging the retention priority as for the one reproduction control data when the one reproduction control data is stored into the memory area selected by said selecting device; and an updating device for updating the retention priority data stored in said retention priority memory in accordance with the retention priority judged by said priority judging device.

11. An apparatus according to claim 10, wherein the reproduction data is recorded on said record disc in such a condition that the reproduction data is divided into a plurality of blocks, and said priority judging device judges that the retention priority of the reproduction control data indicating a record position of a block of the reproduction data, is higher than that not-indicating the record position.

12. An apparatus according to claim 8, wherein said data managing device further comprises:

an initializing device for initializing the number of times of usage as for the one reproduction control data when the one reproduction control data is stored into the memory area selected by said selecting device; and an incrementing device for incrementing the number of times of usage in the usage frequency data stored in said usage frequency memory each time when respective one reproduction control data stored in the memory areas is used.

13. A reproducing apparatus comprising a reading device for reading reproduction data and reproduction control data to control a reproduction of the reproduction data from a record disc, on which the reproduction data and the reproduction control data are recorded, a record medium having a plurality of memory areas, a data managing device for storing one reproduction control data read by said reading device into one of the memory areas, and a reproducing device for reproducing the reproduction data in accordance with reproduction control data stored in the memory areas, said data managing device comprising:

a usage frequency memory for storing usage frequency data, which indicate the number of times of usage as for each reproduction control data respectively stored in the memory areas;

a selecting device for selecting one of the memory areas, into which the one reproduction control data read by said reading device is to be stored, on the basis of the usage frequency data stored in said usage frequency memory, when the one reproduction control data is read by said reading device;

a storing device for storing the one reproduced control data read by said reading device into the memory area selected by said selecting device; and a counter device for counting the number of times of usage of the reproduction control data.

14. An apparatus according to claim 13, wherein said data managing device further comprises:

an initializing device for initializing the number of times of usage as for the one reproduction control data when the one reproduction control data is stored into the memory area selected by said selecting device; and an incrementing device for incrementing the number of times of usage in the usage frequency data stored in said usage frequency memory each time when respective one reproduction control data stored in the memory areas is used.

15. An apparatus according to claim 13, wherein a data reading speed of said record medium is faster than that of the record disc.

16. An apparatus according to claim 13, wherein said record medium comprises a work memory used when said reproducing device is controlled by a controller in accordance with the reproduction control data.

17. An apparatus according to claim 13, wherein said record medium comprises a first work memory used when an error correction process is performed onto data groups including the reproduction data and the reproduction control data, and a second work memory used when said reproducing device is controlled by a controller in accordance with the reproduction control data, and said data managing device stores the one reproduction control data into one of the memory areas in said first work memory and into one of the memory areas in said second work memory, independently from each other.

18. An apparatus according to claim 13, wherein said record medium comprises a work memory used when an error correction process is performed onto data groups including the reproduction data and the reproduction control data.

* * * * *